UNITED STATES PATENT OFFICE 2,441,800

PROCESS OF PREPARING NITRO AZO COMPOUNDS

Edward Franklin Degering, La Fayette, Ind., and Charles F. Feasley, Thorofare, N. J., assignors to Purdue Research Foundation, La Fayette, Ind., a corporation of Indiana No Drawing. Application October 2, 1942, Serial No. 460,550

4 Claims. (Cl. 260—174)

The present invention relates to certain crystalline nitro azo compounds and to a process of producing nitro azo compounds. More particularly it is concerned with a process of preparing nitro azo compounds wherein a ring-substituted primary aromatic amine, which forms a diazo compound stable towards the alkaline aqueous medium employed in the subsequent coupling reaction, is first diazotized in an acid medium, the resulting diazonium salt solution is then mixed with a low-molecular weight secondary nitroalkane in a cooled aqueous medium of alkaline reaction containing sufficient caustic alkali to neutralize said diazonium salt solution and to produce a pH at least as high as that of an aqueous solution of an alkali metal salt of said nitroalkane in order to ensure maintenance of the nitroalkane in the form of its alkali metal salt during the resulting coupling reaction, followed by recovery of the nitro azo compound thus formed.

By the expression "ring-substituted primary aromatic amine" as used above we mean amines having the general formula $Ar—NH_2$, wherein Ar may represent a heteroaryl radical, such as the pyridine or thiazole radicals, or one of the following radicals:

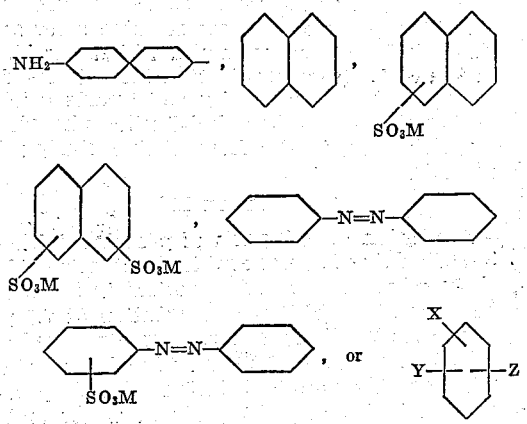

wherein X represents either alkyl, alkoxy, halogen, $—COOM$, $—NO_2$, $—SO_3M$, or $—NHCOCH_3$; Y may be alkyl, halogen, $—NO_2$, $—SO_3M$, or hydrogen; and Z may represent halogen or hydrogen, and M is either hydrogen or an alkali metal.

As examples of the nitro azo compounds which may be prepared by the process defined above then may be mentioned the 4-acetoaminobenzeneazonitroalkanes, and the 4,4'-biphenyl-bis-azo-nitroalkanes which have the following structural formulas respectively:

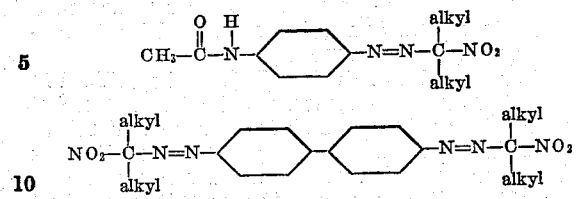

In accordance with the present invention, compounds of the type represented by the original generic formula are prepared by diazotizing the desired aromatic mono- or diamine in an acid medium and, thereafter, coupling the diazotized amine with the salt of a secondary nitroparaffin. Specifically, the aromatic mono- or diamine is first diazotized in an acid medium, after which the concentration of base therein is made equal to or slightly greater than that of the alkaline aqueous secondary nitroparaffin solution by adding the said diazotized solution to a relatively strong solution of a suitable base, such as sodium or potassium hydroxides. This quantity produces a total quantity of base in the reaction medium of double the equivalent of the nitroparaffin used, that is, at least 100% excess of base. Immediately after this step, an aqueous solution of an alkali or alkaline earth metal salt of a secondary nitro-paraffin is added to the diazotized amine solution, said nitroparaffin salt being preferably added thereto in a ratio of one mole of the salt per amine group present in the original aromatic amine.

In this connection we have found that the coupling of the secondary nitroparaffin salt with the diazotized aromatic amine must be effected in a medium having a pH equal to or slightly greater than the pH of the concentrated secondary nitroparaffin salt solution used. Expressed in another manner, it may be said that the reaction should be carried out under conditions where the equilibrium, represented by the equation

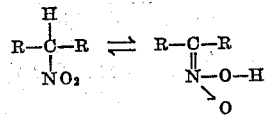

is displaced toward the right, i. e., under conditions favoring salt formation, that is the alkali content or pH of the coupling medium must be sufficiently high to maintain the nitroparaffin in salt form during the coupling reaction. It was previously known to us that the pH of the medium in condensation or coupling reactions is a directive factor, but as far as we are aware, however, no one has ever found that the pH in such reactions constituted a determining factor. In fact, the reaction involved in the present invention was attempted previously by others, employing a pH of sufficient acidity to liberate the nitroparaffin from its salt but without success. By prior procedures, no crystalline products were ever produced, nor was there at any time a product isolated. We have discovered, however, that by maintaining the pH of the reaction medium within the above-specified range, nitro azo compounds of the aforesaid type may be produced and isolated in a form sufficiently pure for the majority of technical uses.

The resulting products, which are solids at ordinary temperatures, may be filtered from a cold solution and recrystallized from a suitable solvent such as ethyl alcohol. The normally liquid products may, in general, be purified by distillation under vacuum. However, certain of these materials decompose rather rapidly under such conditions, and can only be purified by extraction or other suitable means.

Any secondary nitroparaffin may be utilized in carrying out our process, and by the expression "secondary nitroparaffin" it is to be understood that such terminology is to cover the aliphatic secondary nitroparaffins. By secondary nitroparaffin salt, we mean the resulting product formed by the reaction of a secondary nitroparaffin with an alkali metal hydroxide or an alkaline earth metal hydroxide. As examples of such compounds there may be mentioned 2-nitropropane, 2-nitrobutane, the secondary nitropentanes, the secondary nitrohexanes, and the like. It is to be noted that any compound containing more than one secondary nitro group, with one hydrogen atom on each carbon atom holding a nitro group, will couple with one equivalent of diazonium salt and/or hydroxide per secondary nitro group in the compound, and it is to be further understood that the term "secondary nitroparaffin" includes such compounds.

The aromatic amines which may be employed in our process constitute a wide variety of substituted and unsubstituted aromatic monoamines and aromatic diamines, and as examples of such compounds there may be mentioned sulfanilic acid, 1-aminobenzene-3,4-disulfonic acid, p-nitroaniline, p-aminobenzoic acid, 2-naphthylamine-6-sulfonic acid, 4-amino-3-nitrobenzenesulfonic acid, 4-aminoazobenzene-4'-sulfonic acid, o-nitroaniline, m-nitroaniline, 4-nitro-2-aminotoluene, p-aminoacetanilide, o-chloroaniline, o-bromoaniline, 2,5-dichloroaniline, 2,4,6-tribromoaniline, p-toluidine, o-aminobenzoic acid, p-aminoazobenzoic acid, beta-naphthylamine, 2,4-diaminotoluene, 2,4-dinitroaniline, 1-phenyl-2,3-dimethyl-4-amino-5-pyrazolone, 3-aminoindazole, 2-amino-4-methylthiazole, 2-aminopyridine, 3-aminopyridine, o-anisidine, m-anisidine, p-anisidine, and the like.

In general, it may be said that any aromatic amino compound capable of being diazotized may be employed in our process for the preparation of the novel nitro azo compounds of the present invention, providing, of course, that no appreciable reaction occurs between one or more molecules of the diazotized amine during the process, that is, the diazotized amine must be stable in aqueous alkali media, such as are employed in the coupling reaction. Also, the acid utilized in the diazotization step may be any of several, such as, for example, hydrochloric, nitric, phosphoric, sulfuric, acetic, and the like. The temperature at which diazotization may be effected can vary from between about $-5°$ C. to not in substantial excess of $30°$ C., depending upon the particular amine being diazotized; while the solvent employed may be any of several liquids or mixtures thereof in which the final product is substantially insoluble. However, in the majority of instances we prefer to use water.

The examples which follow are illustrative of the scope of our invention. However, it is to be understood that such examples are not to be considered as limiting the present invention in any respect.

EXAMPLE I

A solution of 17.2 parts of p-bromoaniline in 35.7 parts of 38 per cent hydrochloric acid and 62.5 parts of water was diazotized at $0°$ C. by the dropwise addition of an aqueous solution containing 7.5 parts of sodium nitrite. The diazotized solution was poured into a solution consisting of 20.7 parts of sodium hydroxide, 250 parts of water, and 200 parts of cracked ice. A solution of 8.9 parts of 2-nitropropane in 4 parts of sodium hydroxide and 125 parts of water was immediately added to the slightly alkaline diazotized solution with thorough agitation. The resulting solution gave 24.5 parts of crude 2-(4-bromophenylazo)-2-nitropropane (90.4 per cent yield), a yellowish-brown solid which was filtered in the cold. Recrystallization four times from 95 per cent ethyl alcohol gave 21.2 parts (78.3 per cent yield) of brownish-orange crystals.

EXAMPLE II

A solution of 15.2 parts of 4-nitro-2-aminotoluene, 35.7 parts of 38 per cent hydrochloric acid, and 62.5 parts of water, was diazotized at $25°$ C., by the dropwise addition of a solution of 7.5 parts of sodium nitrite in water. This acid solution of 3-nitrotoluene-2-diazonium chloride was then poured into a solution containing 20.7 parts of sodium hydroxide, 250 parts of water, and 200 parts of ice. A solution of 10.3 parts of 2-nitrobutane in 4.0 parts of sodium hydroxide and 125 parts of water was immediately added to the slightly alkaline diazotized solution with thorough agitation. There resulted after sometime a brilliant yellow powder which was filtered in the cold. Recrystallization three times, from 95 per cent ethyl alcohol gave 19 parts (71.5 per cent yield) of 2-(2-methyl-5-nitro-phenylazo)-2-nitrobutane, in the form of fine, fluffy yellow crystals.

EXAMPLE III

A solution of 19.7 parts of p-aminoazobenzene in 35.7 parts of 38 per cent hydrochloric acid and 62.5 parts of water was diazotized in the cold by the dropwise addition of a solution of 7.5 parts of sodium nitrite in water. The diazotized solution was made slightly alkaline by pouring it with stirring into a solution of 20.7 parts of sodium hydroxide, 250 parts of water and 200 parts of cracked ice. A previously prepared solution of 8.9 parts of 2-nitropropane in 125 parts of water was poured in with stirring. The resulting solution turned a brownish hue and large quantities of a brown powder separated and were filtered in the cold. Recrystallization two time from 95 per cent ethyl alcohol gave 26.5 parts of 2-phenyl-(1-phenylenediazo)-2-nitropropane, a brown crystalline product corresponding to a yield of 89 per cent.

EXAMPLE IV

A solution of 28.7 parts of 2-naphthylamine in 71.5 parts of 38 per cent hydrochloric acid and 125 parts of water was diazotized in the cold by the dropwise addition of a solution of 15 parts of sodium nitrite in water. The diazotized solution was then made slightly alkaline by pouring the same, with agitation, into a solution of 41.3 parts of sodium hydroxide, 500 parts of water, and 300 parts of cracked ice. Immediately after neutralization a previously prepared solution of 17.8 parts of 2-nitropropane in 8.0 parts of sodium hydroxide and 250 parts of water was added with stirring. There then appeared a brownish-red curdy precipitate which rose to the top of the solution and was filtered in the cold. Recrystallization two times from 95 per cent ethyl alcohol gave 31.5 parts (64.7 per cent yield) of 2-(2-naphthylazo)-2-nitropropane in the form of thin brownish-red plates.

EXAMPLE V

Eighteen and forty-one hundredths parts of benzidine dissolved in 71.4 parts of 38 per cent hydrochloric acid and 125 parts of water was diazotized by adding dropwise thereto an aqueous solution containing 15 parts of sodium nitrite. The solution containing this diazotized product was then made alkaline by pouring the same into a suspension of 200 parts of ice in a solution consisting of 41.3 parts of sodium hydroxide and 500 parts of water. Immediately thereafter, a solution containing 17.8 parts of 2-nitropropane, 8 parts of sodium hydroxide and 250 parts of water was added thereto. The resulting solution became yellowish green, and when chilled with ice yielded a greenish brown solid which was filtered off. This solid, after two recrystallizations from 95 per cent ethyl alcohol, gave 35.5 parts, corresponding to a yield of 87.2 per cent, of 4,4'-biphenyl-bis-(2-azo-2-nitropropane) in the form of dark brown needles.

The data contained in the table below disclose certain physical properties of the compounds described in the preceding examples, as well as similar compounds not specifically described but prepared in accordance with the procedures set forth above.

From the foregoing description it may be seen that the present invention has made available to the art a large group of compounds which are novel in structure, and which therefore may be utilized in synthesizing numerous other novel compounds.

The nitro azo compounds produced by our process are relatively insoluble in water, providing of course, they have no water-solubilizing groups such as —COOM, —$SO_3$M, and the like; where M represents hydrogen, alkali metal, or alkaline earth metal. They are, however, somewhat soluble in alcohol, acetone, and benzene. These compounds have also been found to possess good affinity for wool, cotton, and silk fibers, providing suitable acidic or basic groups are present in the final azo compounds. These dyed fibers in yellow, brown, orange and purple shades, are characterized by good fastness to washing, milling, and light.

Our invention now having been described, what we claim is:

1. In the manufacture of crystalline nitroazo compounds, the process which comprises diazotizing in an acid medium a ring-substituted primary aromatic amine which forms a diazo compound stable towards the alkaline aqueous medium employed in the subsequent coupling reaction, mixing and coupling the resulting diazonium salt solution with a low-molecular-weight secondary nitroalkane in a cooled aqueous medium of alkaline reaction containing sufficient caustic alkali to neutralize said diazonium salt solution and to produce a pH at least as high as that of an aqueous solution of an alkali metal salt of said nitroalkane in order to ensure maintenance of the nitroalkane in the form of its alkali metal salt during the coupling reaction and recovering the resulting nitroazo compound.

2. In the manufacture of crystalline nitroazo compounds, the process which comprises diazotizing in an acid medium a ring-substituted primary aromatic amine which forms a diazo compound stable towards the alkaline aqueous medium employed in the subsequent coupling reaction, neutralizing the resulting diazonium salt solution, cooling and mixing said solution with an aqueous solution of an alkali metal salt of a low-molecular-weight secondary nitroalkane to produce coupling, the reaction medium having a pH which is at least as high as that of an aqueous solution of said alkali metal salt to ensure main-

Table

| Compound | Per Cent Nitrogen | | Color | Melting Point, °C. |
|---|---|---|---|---|
| | Calcd. | Found | | |
| 2-Nitrobenzene-(2-azo-2-nitropropane) | 23.5 | 23.3 | dark brown | 56.9 |
| 3-Nitrobenzene-(2-azo-2-nitropropane) | 23.5 | 23.6 | yellow | 71.2–72.2 |
| 3-Nitrobenzene-(2-azo-2-nitrobutane) | 22.2 | 22.1 | do | 63.3–63.7 |
| 2-Methyl-5-nitrobenzene-(2-azo-2-nitropropane) | 22.2 | 22.3 | red-yellow | 70.1 |
| 2-Methyl-5-nitrobenzene-(2-azo-2-nitrobutane) | 21.0 | 21.1 | yellow | 48.9 |
| 4-Acetoamidobenzene-(2-azo-2-nitropropane) | 22.4 | 22.3 | yellow-brown | 125.3–125.8 |
| 4-Chlorobenzene-(2-azo-2-nitropropane) | 18.5 | 18.5 | red-brown | 67.8 |
| 4-Bromobenzene-(2-azo-2-nitropropane) | 15.4 | 15.4 | brown-orange | 90–91 |
| 2,5-Dichlorobenzene-(2-azo-2-nitropropane) | 16.1 | 16.2 | yellow | 57–58 |
| 2,5-Dichlorobenzene-(2-azo-2-nitrobutane) | 15.3 | 15.5 | do | 40–40.3 |
| 2,4,6-Tribromobenzene-(2-azo-2-nitropropane) | 9.8 | 9.9 | do | 58.1 |
| 2,4,6-Tribromobenzene-(2-azo-2-nitrobutane) | 9.5 | 9.6 | do | 57.4–58 |
| 4-Methylbenzene-(2-azo-2-nitropropane) | 20.3 | 20.4 | red oil | 20±1 |
| 2-Carboxybenzene-(2-azo-2-nitropropane) | 17.7 | 17.8 | orange-yellow | 93.2–93.6 |
| 4-Carboxybenzene-(2-azo-2-nitropropane) | 17.7 | 17.8 | yellow | 167–169 (dec.) |
| 4-Carboxybenzene-(2-azo-2-nitrobutane) | 16.7 | 16.9 | do | 129–130 (dec.) |
| 2-[4-Azo-(azobenzene)]-2-nitropropane | 23.5 | 23.2 | brown | 107–108 (dec.) |
| 2-[4-Azo-(azobenzene)]-2-nitrobutane | 22.5 | 22.2 | light brown | 80.9–81.4 |
| 4,4'-Biphenyl-bis-(2-azo-2-nitropropane) | 21.9 | 21.5 | brown | 162–163.6 (dec.) |
| 2-Naphthylene-(2-azo-2-nitropropane) | 17.3 | 17.1 | purple-brown | 67 | tenance of the nitroalkane in the form of its salt during the coupling reaction, and recovering the resulting nitroazo compound.

3. In the manufacture of crystalline nitroazo compounds, the process which comprises diazotizing a biphenyl amine, which forms a diazo compound stable towards the alkaline aqueous medium employed in the subsequent coupling reaction, mixing and coupling the resulting diazonium salt solution with a low-molecular-weight secondary nitroalkane in a cooled aqueous medium containing sufficient caustic alkali to neutralize said diazonium salt solution and to produce a pH at least as high as that of an aqueous solution of an alkali metal salt of said nitroalkane in order to ensure maintenance of the nitroalkane in the form of its alkali metal salt during the coupling reaction, cooling and recovering the resulting nitroazo compound.

4. A nitro azo compound of the formula:

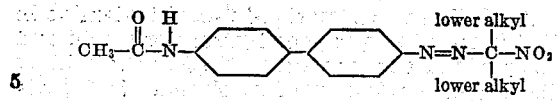

EDWARD FRANKLIN DEGERING.
CHARLES F. FEASLEY.

REFERENCES CITED

The following references are of record in the file of this patent:

Meyer, Ambuhl, Ber. Deut. Chem. Gesell., vol. 8, page 1076.

C. F. Feasley et al., The Condensation of Aryl Diazonium Salts and or Hydroxides with Secondary Nitro Alkanes, Jour. of Organic Chem., vol. 8, 1943.